United States Patent [19]

Tonchen

[11] Patent Number: 4,609,213
[45] Date of Patent: * Sep. 2, 1986

[54] PREFORMED BAND FOR USE IN COUPLING TUBULAR MEMBERS

[76] Inventor: Stephen Tonchen, 405 N. Main St., P.O. Box 705, Kewanee, Ill. 61433

[*] Notice: The portion of the term of this patent subsequent to Aug. 21, 2001 has been disclaimed.

[21] Appl. No.: 431,387

[22] Filed: Sep. 30, 1982

Related U.S. Application Data

[63] Continuation-in-part of Ser. No. 353,108, Aug. 21, 1984, Pat. No. 4,466,642.

[51] Int. Cl.⁴ .............................................. F16L 21/00
[52] U.S. Cl. .................................. 285/419; 285/424; 29/445; 29/526 R
[58] Field of Search ......... 285/419, 424, 373, DIG. 4, 285/256, 341, 248; 29/445, 526; 24/20 R, 23 R, 279

[56] References Cited

U.S. PATENT DOCUMENTS

| | | | |
|---|---|---|---|
| 2,116,165 | 5/1938 | Ulman | 285/419 X |
| 2,753,962 | 7/1956 | McBerty | 29/526 R |
| 3,944,265 | 3/1976 | Hiemstra | 285/419 |
| 4,019,762 | 4/1977 | Eidelberg | 285/341 |
| 4,312,526 | 1/1982 | Cassel | 285/419 |
| 4,466,642 | 8/1984 | Tonchen | 285/419 |

FOREIGN PATENT DOCUMENTS

| | | | |
|---|---|---|---|
| 142779 | 4/1949 | Australia | 285/256 |
| 215670 | 4/1968 | U.S.S.R. | 285/419 |

Primary Examiner—Dave W. Arola
Attorney, Agent, or Firm—Neuman, Williams, Anderson & Olson

[57] ABSTRACT

An apparatus is disclosed for coupling of tubular members using a strip of metal which is preformed with an arcuate bend portion having a limited length in relation to the overall length of the strip and including two bend portions having radii so related to the radii of the tubular members as to obtain enhanced gripping and enhanced ease of installation. The strip receives a gland ring and also a helical wire for seating in grooves of a flexible conduit and is otherwise constructed to obtain an enhanced seal.

9 Claims, 6 Drawing Figures

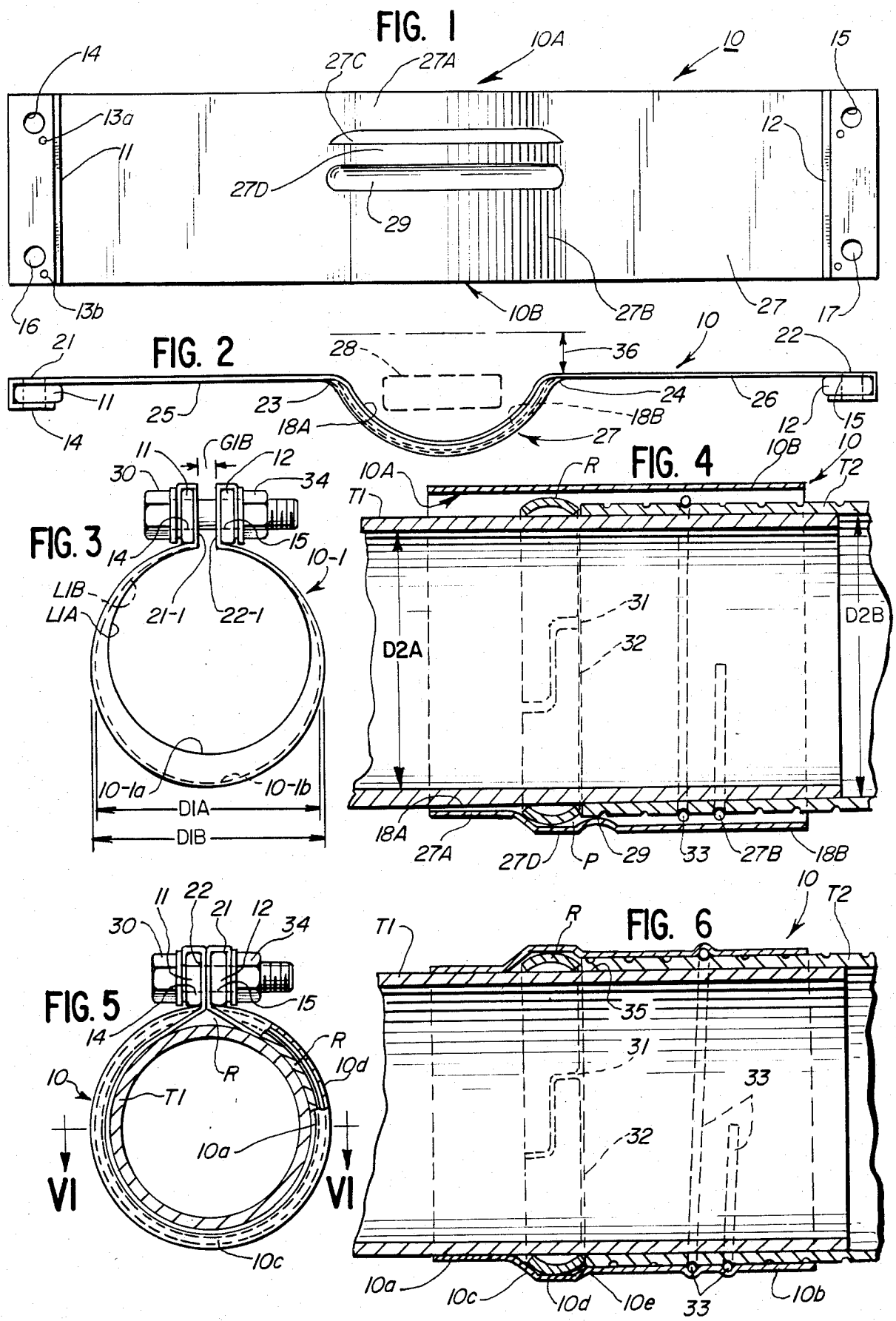

ation Ser. No. 353,108. The said application was
issued Aug. 21, 1984 as U.S. Pat. No. 4,466,642.

PREFORMED BAND FOR USE IN COUPLING TUBULAR MEMBERS

This application is a continuation-in-part of said application Ser. No. 353,108. The said application was issued Aug. 21, 1984 as U.S. Pat. No. 4,466,642.

CROSS-REFERENCE TO RELATED APPLICATION

Reference is made to my pending U.S. application for patent Ser. No. 353,108 filed Mar. 1, 1982; the specification and drawings of this pending application are hereby incorporated herein by reference in their entirety; and claim is made to the benefit of this earlier filing date as to the incorporated subject matter pursuant to 35 USC 120.

SUMMARY OF THE INVENTION

In one aspect, the present invention relates to a coupling for tubular members wherein a flat strip is preformed so as to enhance its coupling effectiveness when assembled about the tubular members in the field, the preformed strip retaining a configuration such that it can be packaged in an essentially similar container as is presently widely used. This facilitates storage of the packaged preformed strips. It is conceived that a strip preformed according to the teachings herein, will require less effort during application to a point between tubular members by the end user, and will provide a tighter grip on the tubular members than when a flat band is applied in the field, for any given amount of applied tightening force.

In another aspect of the invention, a flat strip may be preformed into an optimum or near-optimum configuration before application to tubular members; such preformed configuration result in a substantial increase in the strength of gripping forces securing the tubular members. In the ideal case, increased gripping by a factor of ten may be realized.

One feature of the invention resides in the provision of a preformed band which accomodates a split gland ring. For the case of telescoping tubular members, the gland ring may be placed in encircling relation to the smaller diameter tubular member and against the end edge of the larger diameter member so as to effect a sealing of the joint between the tubular members as well as enhancing the gripping forces.

A further feature of the invention resides in the provision of a wire interlocking means for use in conjunction with the preformed band of the present invention for interlocking a flexible conduit type tubular member with the applied band. Optimally the interlocking member has a cross section to project slightly from an exterior helical groove of the flexible conduit and may itself be formed helically so as to fit within one and one-half turns of the groove of the conduit.

Further advantages and details of the invention are apparent from the following description of exemplary embodiments on the basis of the accompanying drawings, and other objects, features and advantages will be apparent from this detailed disclosure and from the appended claims. While the drawings illustrate exemplary full-feature embodiments, the invention is also directed to any part or parts of the illustrated embodiments.

BRIEF DESCRIPTION OF THE DRAWINGS

FIG. 1 is a diagrammatic plan view of a preformed band which may be utilized for coupling tubular members having respective different diameters at a juncture therebetween; said figure illustrating certain teachings and concepts of the present invention, any one or more of which can be applied by means of prefabricating steps to an initially flat band of sheet metal;

FIG. 2 is a somewhat diagrammatic side elevational view of the preformed band of FIG. 1;

FIG. 3 is an idealized end elevational view of a completely C-shaped band configuration, useful for explaining certain aspects of the present invention;

FIG. 4 is a somewhat diagrammatic longitudinal sectional view showing the band of FIGS. 1 and 2 in cross section prior to application to the tubular members of a telescopic joint, and illustrating the optional utilization of a split gland ring, and the optional utilization of a helical interlocking wire, in conjunction with the band of FIGS. 1 and 2;

FIG. 5 is a somewhat diagrammatic cross sectional view illustrating a preferred embodiment of the present invention, and showing the manner of application of the embodiment of FIGS. 1 and 2 in the coupling of first and second tubular members having different outside diameters at the juncture therebetween, and known in the art as a jump size fitting; and FIG. 6 is a somewhat diagrammatic partial longitudinal sectional view taken generally along the line VI—VI of FIG. 5; and illustrating the optional utilization of a split gland ring and a wire interlocking means.

DETAILED DESCRIPTION

FIG. 1 illustrates a preformed band 10 which may be hand installed about telescoped tubular members, and then tightened by means of threaded fasteners so as to tend to conform the band to the peripheral surfaces of the tubular members. In a specific example, the band may be of AISI 302 annealed stainless steel sheet having a thickness of 0.020, 0.030 or 0.040 inch and a width of greater than three inches according to the trade size of the tubular members. The strip stock of desired width and thickness may be obtained in a coiled form.

In a specific example of such preformed band for coupling of telescoped stainless steel tubular parts of an automotive exhaust system, the band 10 is provided with reinforcing bars 11 and 12 at the opposite ends such that the length (LA) along the inner surface 10A at one side is at least about one-fourth inch less than the length (LB) along the inner surface 10B at the other side of the strip. The strip ends may be installed about the bars 11 and 12, and welded thereto by spot welds such as indicated at 13a and 13b. The threaded fasteners may be accomodated by cooperating bolt holes 14,15 and 16,17 extending through the reinforcing bars 11 and 12. The holes 14–17 may be of diameter to slip-fit receive one-half inch diameter bolts serving as force means in conjunction with nuts and washers, for drawing the reinforcing bars toward each other accurately in parallel, once the strip has been hand-formed about the tubular members.

Referring to FIG. 1, the longitudinal portions 10A and 10B of the band 10 are first properly set with a preformed curvature to securely engage with respective tubular members having circumferential values (designated C2A and C2B) greater than the respective lengths (LA and LB) of such longitudinal portions 10A and 10B as preformed (after release of forming pressures). In the illustrated embodiment, preformed curvature is introduced at 18A and 18B, and to this end the central part of a flat band may be worked by a substantial amount so as to introduce dip curvatures preformed with a substantial set.

In order to retain the advantages of a flat package and convenient storage, the present invention provides a prefabricated band with horizontally oppositely extending ends 21 and 22 lying substantially in a common plane with the upper part of regions 18A and 18B as seen in FIG. 2.

The band has reversely curving connecting portions 23 and 24 and oppositely directed end portions 25 and 26 which extend in opposite directions from a central arcuate bend portion 27 which has the segmental cylindrical interior surfaces 18A and 18B. The length of segmental cylindrical surfaces 18A and 18B may be on the order of about one-third or less of the respective side length dimensions (LA and LB, respectively) of the preformed band.

With the preformed band configuration of FIGS. 1 and 2, the overall lengths LOA and LOB measured in a straight line are reduced in comparison to corresponding distances for a completely flat band, while the thickness dimensions overall HOA and HOB may be less than one-half of the ideal diametric values (D1A and D1B) discussed in reference to FIG. 3. For a six inch value (D2B) for the larger O.D. tubular member, an ideal diametric value (D1B) would be slightly less than six inches and HOB would be less than three inches. The spaces provided by the arcuate bend portion 27, in a plastic package conforming to the preformed band of FIGS. 1 and 2, would enable placing a packet of bolts, washers and nuts, indicated at 28 in FIG. 2, within the rectilinear space defined by the length LOB, the height HOB and the width of the band, e.g., greater than three inches, for sizes of the band corresponding to sizes of the smaller tube inside diameter of two inches through six inches, for example.

Referring to FIG. 1 which corresponds to a bottom plan view in relation to FIG. 2, the dip or bulge portion 27 includes an arcuately extending indentation 29 which forms a projection on the opposite face for extending into a groove formed between one side of a gland ring (indicated at R, FIG. 4) and the end of the larger-diameter tubular member (T2, FIG. 4). The dip or bulge portion 27 includes an A side region 27A, a B side region 27B, an intermediate transition region 27C and a region 27D located between the transition region 27C and the indentation 29. Regions 27B and 27D have about the same radial dimensions which is greater than that of the region 27A and the intermediate transition region 27C provides a smooth transition between the levels of the regions 27A and 27D.

FIG. 3 shows an idealized band 10-1 preformed into a C configuration with preformed (or set) segmental cylindrical faces 10-1a and 10-1b of mean diameters D1A and D1B less than the respective outside diameters D2A and D2B of the telescoped tubular members (shown at T1 and T2 in FIGS. 4–6) to be engaged thereby. Taking account of preliminary stretching of the band at its apertured and welded ends 21-1 and 22-1 in FIG. 3 and suitable tolerances in the dimensions and positioning of the bars 11 and 12, it would be convenient to have the arcuate distances (designated for purposes of this description as L1A and L1B) of the preformed segmental cylindrical surfaces 10-1a and 10-1b such that when the band is placed about the tubular members T1 and T2 there is a separation or gap between the reinforced ends 21-1 and 22-1, in FIG. 3, of the band before tightening of the bolts 30, of about three-eigth inch or less. For example the C-shaped band 10-1 might have, as formed, an arcuate length (L1A) on the A side equal to the circumference (C2A) of the inner tubular member T1, FIGS. 4 and 6, less $\frac{3}{8}$ inch, while, as formed, the arcuate length (L1B) on the B side would correspond to the circumference (C2B) of the larger diameter tubular member T2, less $\frac{3}{8}$ inch. Where a larger tube diameter (D2B) of a telescoping joint exceeds the smaller tube diameter (D2A) by $\frac{1}{4}$ inch, the arcuate length of the preformed C-shaped band 10-1 on the B side might be $\pi/4$ inch ($\pi \times \frac{1}{4}$) longer than the arcuate length of the preformed C-shaped band 10-1 on the A side. This can be accomplished by an oval shaped surface 10-1b where the diameter from four o'clock to eight o'clock (at least 120°) has a curvature essentially of the diameter D1B which is slightly less than the minimum outside diameter (D2B) of the larger tube, and where the portions of the band from nine o'clock to twelve o'clock and from twelve o'clock to three o'clock have a meandering configuration impressed by an expansion tool or by comparable means.

In a prior completely preformed C-shaped band type clamp of the present applicant, a tubular configuration of a diameter D1A was expanded at its B section by means of a tool with arcuate faced segments at two, four, six, eight, ten and twelve o'clock and with the twelve o'clock gap region of the tubular configuration held such that all vertical expansion took place at the six o'clock side of the B section. The result was a so-called Tie Tube configuration wherein straight (non-notched) reinforcing bars were applied at the twelve o'clock positions at each end of the band. Such a Tie Tube configuration was utilized for a metal to metal sealing type of coupling for telescoping tubular members having respective outside diameters D2A and D2B somewhat larger than the preformed diameters D1A and D1B of the Tie Tube interior surfaces.

With the completely preformed C-shaped configuration of a Tie Tube it would be desirable for the sake of nesting type storage of stacks of Tie Tubes and for the sake of relatively flat packaging to be able to bend the sides of the Tie Tube for example at three o'clock and at nine o'clock to form a configuration generally as illustrated in FIG. 2 hereof with the free ends of the band and the associated reinforcing bars extending generally horizontally in opposite directions from the worked segments of the band at four o'clock and at eight o'clock respectively. In this case the worked segments at two o'clock and at ten o'clock would bulge in a downward direction at each side of the larger bulge represented by the smoothly merging worked segments at four, six and eight o'clock.

In order to realize such an open tri-bulge Tie Tube, the A section must be coordinated with the B section so as to have worked segments at two, four, six, eight and ten o'clock, and so as to merge with the B section at three o'clock and at nine o'clock without the formation of such an offset as would prevent a smooth bend. Metal working procedures for producing an open tri-bulge Tie Tube, based on the foregoing explanation, will be apparent to those skilled in the art.

For a simplified single bulge open Tie Tube, a hand mode of production has been utilized with two symmetrically arranged confronting bands with 120° bulges simultaneously formed respectively at four- six- eight o'clock and at ten- twelve- two o'clock, with expansion of at least ⅛ inch initially at the six o'clock region as will hereafter be explained for a trade size of 3.5 inches.

In the production of a tri-bulge open Tie Tube from the single bulge Tie Tube, it is only necessary to introduce bulges at two o'clock and at ten o'clock in the flat horizontally oppositely directed free end portions of the single bulge open Tie Tube. Such bulges can be produced using die faces of suitable configuration for essentially producing bulge configurations at two and ten o'clock regions of the horizontal portions of the band corresponding to the configurations at two o'clock and at ten o'clock of the original completely preformed C-shaped Tie Tube.

As a specific example in relation to FIG. 3, assume that for a trade size of 3.5 inches the outside diameter D2A (nominal) is 4.000 inches and the outside diameter D2B (nominal) is 4.250 inches. In this case, the initial form of a C-shaped band (10-φ) may present equal initial diametric values on the A and B sides (DφA and DφB) both equal to D1A for example. An expansion tool with exterior segmental cylindrical surfaces at two, four, six, eight, ten and twelve o'clock as viewed in FIG. 3 may then act on the C-shaped band (10-φ) at the B side expanding the B side to an expanded configuration exceeding the size of band 10-1 wherein the interior surface of the band at six o'clock on the B side has been (diametrically) expanded by at least one-eighth inch while the band material at twelve o'clock (at both A and B sides) has remained at a fixed reference position, for example because of the rigid positioning of the reinforcing bars 11, 12. The tool exterior segmental cylindrical faces of the expansion tool may have all moved radially outwardly by precisely the same amount such that when the expansion tool is contracted again to its initial size, the resultant circumferential dimension L1B of C-shaped band 10-1, FIG. 3, on the B side essentially corresponds to a circular C-shape as in FIG. 3 with a diameter of D1B and a gap G1B. The final preformed diameters D1A and D1B of the band 10-1, FIG. 3, may be less than the values D2A (nominal) and D2B (nominal) by more than the tolerance of plus or minus 0.010 inch; D1A may be more than 0.010 inch less than 4.000 and D1B may be more than 0.010 inch less than 4.250.

From these relationships it will be understood that the material of the band at six o'clock at the B side has been circumferentially stretched by the expansion tool by an amount of at least three-sixteenth inch ($\pi \times 1/16$ inch) in relation to an initial length (LφB) at the B side, which is at least about one and one-half percent (with the expansion tool in its expanded condition). If the spring back of the type 302 stainless steel is about 0.25% with respect to longitudinal tension, then the band will have a permanent circumferential elongation of at least about one percent and will exhibit a preformed set in its final configuration. The final length values (L1A and L1B of the band at the A side and at the B side, respectively), will be slightly less than the corresponding minimum circumferential values C2A(min) and C2B(min) of the tubular members (i.e. 3.990$\pi$ inches and 4.240$\pi$ inches, taking account of the tolerance value of plus or minus 0.010 inch).

For example, for the case of the median or nominal circumferential values of the tubular members of 4.000$\pi$ and 4.250$\pi$ inches, when the preformed band 10-1 is placed about the joint and manually tightly conformed to the joint surfaces, the initial gap between the planar faces of the band at the inner sides of the reinforcing bars 11, 12 may be less than three-eighths inch. As the bolts are tightened so that the preformed and set curvatures of the band are conformed in continuous contacting relation to the actual O.D. surfaces of the joint, the gaps at the A and B sides may be reduced toward one-eighth inch before any substantial circumferential stretching of the band begins to occur. It is considered that the characteristic gripping between the set curvatures of the A and B sides of the band and the OD surfaces of the joint then takes place as the gaps at the A and B sides are reduced from values of about one-sixteenth inch to zero.

When a relatively thin band, e.g., of 0.020 inch thickness, is expanded as described, the band tends to exhibit flats at the regions on the B side at one, three, five, seven, nine and eleven o'clock. It is considered that these flat regions can be more readily bent laterally (and then later oppositely bent to reform a C-shaped band during application to a joint. Thus for a single diameter band (e.g. with the A side omitted and the B side enlarged in width), it would be possible to form temporary ninety degree bends at three o'clock and at nine o'clock so as to form a tri-bulge band with a configuration having the space advantages of the FIG. 2 embodiment for coupling of butt joints or rabbet type telescoping joints with equal outside diameter values for the band-engaging exterior surfaces at the joint. Such joints can have a gland ring applied over each tube end exterior surface (as illustrated for tube end T1 in FIGS. 4 and 6), and the band can have two receiving pockets such as the one indicated at P in FIG. 4, for receiving the respective gland rings, (as shown for gland ring R in FIG. 4).

For the case previously described where a single bulge is initially formed, for example by means of the previously described expansion tool acting on the B sides of two confronting bands simultaneously (one centered at tool twelve o'clock and one centered at tool six o'clock and with preformed dips of the same diameter D1A at both the A and B sides), the final diameter at six o'clock for the B side of each band may be D1A plus about one-fourth inch and such diameter may essentially prevail over at least 120°, i.e. from four o'clock to eight o'clcok. The formation of a further bulge in each outwardly extending end portion (corresponding to 25 and 26 in FIG. 2) then further increases the length (L1B) at the B side relative to the length (L1A) at the A side, so that the B side length exceeds the A side length by about ¾ inch ($\pi \times ¼$ inch). A tool may be utilized which impresses the diameter D1B at the six o'clock region of each band, leaves the three o'clock and nine o'clock regions free to bend (during assembly of the oppositely extending band end portions about a joint) and forms the band end portions at the B side with an undulating configuration whereby the longitudinal extent at the B side at each band end portion exceeds the corresponding longitudinal extent at the A side at each band end portion by about one-fourth inch.

By way of example and not of limitation, the curved regions 23 and 24 may have radii of 0.500 inch at the A side, and 0.625 at the B side without any set thereof such as is present at 18A and 18B. Any other undulations in end portions 25 and 26 would have radii of curvature exceeding 0.500 inch and would also be free of the set condition. By way of example and not of limitation, the dimension indicated at 36 in FIG. 2 may have a value of 0.765 inch for the 3½ inch trade size previously referred to herein. The bars 11 and 12 are preferably of a thickness e.g. 5/16 inch, such that the bars 11 and 12 remain straight and unbent throughout assembly of the band with a joint.

A preferred timing during manufacturing of the prefabricated band of FIGS. 1, 2 and 4, requires that the preforming at 27A through 27D and 29 take place prior to the welding at 13a, 13b and the formation of the holes at 14 through 17, so that exact precision is assured in the final product.

FIG. 4 is a somewhat diagrammatic horizontal sectional view illustrating the band 10 of FIG. 1 loosely formed about a telescopic joint such that bolts 30, FIG. 3, can be inserted through the aligned holes 14,15 and 16,17. The lower portion of FIG. 4 illustrates a section, for example at four o'clock, while the upper sectional portion FIG. 4 may be located at ten o'clock, referring to an orientation such as generally illustrated in FIGS. 3 and 5. FIG. 4 illustrates a gland ring R located within a pocket P of the band 10 defined by the rib portion 29 of the band. The gland ring is preformed with a substantial set at a diameter DR1 which is less than the diameter D2A of the tube T1, so that as the gland ring R is constricted during tightening of the bolts 30, the gap 31 in the gland ring (at the six o'clock position) is progressively reduced until a point is reached where the gland ring R assumes a characteristic gripping relationship to the outside diameter of tube T1. At the same time, the edge 32 of the gland ring may bein direct abutting contact with the end face edge of the tube T2 so as to effect a sealing relationship therebetween. The gland ring R is optional and may be omitted, for example where it is desired to allow the tube T1 to slide within the tube T2 to accommodate thermal expansion, for example.

A further optional feature is the provision of an interlock wire 33 which may be of helical configuration and be seated in one and one-half turns of a flexible conduit type tube T2. With the provision of both the gland ring R and the interlock wire 33, the tubes T1 and T2 will resist relative axial displacement to an extraordinary degree.

As illustrated in FIG. 5, nuts 34 may be tightened to such an extent, that the faces 21 and 22 of the band 10 are in full parallel contacting relationship. As indicated in FIG. 5, the gland ring R effectively seals the joint at the interface 35, FIG. 6, between the tubes T1 and T2 in spite of any tolerances between the outside diameter of the tube T1 and the inside diameter of the tube T2.

As indicated in FIG. 6, with the tightening of the nuts 34 as indicated in FIG. 5, the portion 10A of the band, FIG. 1, is in conforming contacting relationship to the outside diameter of the tube T1 as indicated at 10a. Further, the portion 10B of the band 10, FIG. 1, is drawn into conforming contacting relationship to the outside diameter of the tube T2, for example as indicated at 10b in FIG. 6. A region of the band indicated at 10c in FIG. 6 together with regions 10d and 10e are wrapped into conforming pressure contact with gland ring R as the nuts 34, FIG. 5, are tightened to the final position as indicated in FIG. 5.

Those skilled in the art will recognize that the segmental cylindrical surfaces 18A and 18B, FIG. 2, which are preformed to diameters D1A and D1B with a substantial set will effect a characteristic intense gripping relationship to the outside diameters of the tubes T1 and T2 in a manner somewhat analogous to the operation of the gland ring R. It is particularly advantageous to have a preformed curvature set as represented at 18A and 18B, FIG. 2, at the region diametrically opposite from the free ends of the band, since the six o'clock region tends to receive reduced circumferential forces as the nuts 34 are tightened.

It will be apparent that many modifications and variations may be made without departing from the scope of the teachings and concepts of the present invention.

I claim as my invention:

1. An assemblage of parts useful for coupling first and second tubular members having first and second tubular end portions with nominal diameters which lie within a predetermined diametric range, and having respective actual circumferential extents not less than respective first and second minimum circumferential values, so as to secure the first and second tubular end portions in axially aligned relation with a joint therebetween, said assemblage comprising:

(a) a strip of sheet metal with reinforced ends, and
    (b) progressively adjustable force means for application to said reinforced ends when the strip is wrapped about the joint between said first and second tubular end portions so as to progressively tighten the strip about the joint, wherein the improvement comprises:
    (c) said strip having a preformed arcuate bend therein intermediate the reinforced ends thereof providing first and second arcuate bend portions at opposite longitudinal sides of the strip and adapted to be placed in wrapping relation to portions of the circumference of said first and second tubular end portions,
    (d) the strip having first and second longitudinal portions extending longitudinally between the reinforced ends thereof and extending along the first and second arcuate bend portions with the length dimensions of the first and second longitudinal portions being less than the first and second minimum circumferential values,
    (e) the sheet metal of the strip providing generally oppositely extending end portions extending in generally opposite directions from said arcuate bend portion, and providing reversely curved connecting portions extending between the oppositely extending end portions and the arcuate bend portion with the curvature of the connecting portions being opposite to the curvature of the arcuate bend portion, and
    (f) the sheet metal of the oppositely extending end portions and of the reversely curved connecting portions being in a ductile hand-deformable condition so that the strip can be wrapped by hand about the first and second tubular end portions, the force means being thereafter applied to the reinforced ends so as to progressively tighten the strip into a stretched conforming relationship to the first and second tubular end portions and with the first and second longitudinal portions of the strip firmly gripping respectively the first and second tubular end portions to secure said tubular end portions in said axially aligned relation, wherein said first tubular end portion of said first tubular member has an inside diameter about equal to the outside diameter of said second tubular end portion of said second tubular member to telescopically fit thereon, said first and second arcuate bend portions of said strip being preformed to have first and second inside radial dimensions respectively, said first inside radial dimension being substantially greater than said second inside radial dimension.

2. In an assemblage of parts as defined in claim 1, said first inside radial dimension being greater than said second inside radial dimension by at least one-half the difference between the inside and outside diameters of said first tubular end portion of said first tubular member.

3. In an assemblage of parts as defined in claim 2, said first inside radial dimension being slightly less than one-half the outside diameter of said first tubular end portion of said first tubular member and said second inside radial dimension being slightly less than one-half the outside diameter of said second tubular end portion of said second tubular member.

4. In an assemblage of parts as defined in claim 1, the arcuate extent of said first and second arcuate bend portions being of on the order of 120 degrees.

5. In an assemblage of parts as defined in claim 1, said strip including an intermediate arcuately extending transition region merging at one margin with said first arcuate bend portion and merging at the other margin thereof with said second arcuate bend portion.

6. In an assemblage of parts as defined in claim 5, said first arcuate bend portion having an arcuately extending indentation in spaced relation to said intermediate transition region to define a pocket for receiving a gland ring disposed on said second tubular portion of said second tubular member adjacent the end of said first tubular portion of said first tubular member.

7. In an assemblage of parts as defined in claim 1, said strip being of a thin band of stainless steel and having a thickness of on the order of 0.020 inches.

8. In an assemblage of parts as defined in claim 7, said strip having a width of on the order of three inches and having an overall length of on the order of ten inches or more.

9. An assemblage of parts useful for coupling first and second tubular members having first and second tubular end portions with nominal diameters which lie within a predetermined diametric range, and having respective actual circumferential extents not less than respective first and second minimum circumferential values, so as to secure the first and second tubular end portions in axially aligned relation with a joint therebetween, said assemblage comprising:

(a) a strip of sheet metal with reinforced ends, and (b) progressively adjustable force means for application to said reinforced ends when the strip is wrapped about the joint between said first and second tubular end portions so as to progressively tighten the strip about the joint, wherein the improvement comprises:

(c) said strip having a preformed arcuate bend therein intermediate the reinforced ends thereof providing first and second arcuate bend portions at opposite longitudinal sides of the strip and adapted to be placed in wrapping relation to portions of the circumference of said first and second tubular end portions, (d) the strip having first and second longitudinal portions extending longitudinally between the reinforced ends thereof and extending along the first and second arcuate bend portions with the length dimensions of the first and second longitudinal portions being less than the first and second minimum circumferential values, (e) the sheet metal of the strip providing generally oppositely extending end portions extending in generally opposite directions from said arcuate bend portion, and providing reversely curved connecting portions extending between the oppositely extending end portions and the arcuate bend portion with the curvature of the connecting portions being opposite to the curvature of the arcuate bend portion, and (f) the sheet metal of the oppositely extending end portions and of the reversely curved connecting portions being in a ductile hand-formable condition so that the strip can be wrapped by hand about the first and second tubular end portions, the force means being thereafter applied to the reinforced ends so as to progressively tighten the strip into a stretched conforming relationship to the first and second tubular end portions and with the first and second longitudinal portions of the strip firmly gripping respectively the first and second tubular end portions to secure said tubular end portions in said axially aligned relation, the length of said arcuate bend of said strip being on the order of about one-third or less of the overall length of said strip between said reinforced ends thereof.

* * * * *